(12) United States Patent
Newby et al.

(10) Patent No.: US 10,713,875 B2
(45) Date of Patent: *Jul. 14, 2020

(54) LOW POWER CREDENTIAL DETECTION DEVICE FOR ACCESS CONTROL SYSTEM

(71) Applicant: Schlage Lock Company LLC, Carmel, IN (US)

(72) Inventors: David I. Newby, Avon, IN (US); Frank A. Nardelli, Indianapolis, IN (US); William B. Ainley, Carmel, IN (US); Michael Reuter, Carmel, IN (US); David Smith, Westminster, CO (US); Jineesh Kunnoth, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,809

(22) Filed: Dec. 31, 2018

(65) Prior Publication Data

US 2019/0244452 A1 Aug. 8, 2019

Related U.S. Application Data

(63) Continuation of application No. 15/986,370, filed on May 22, 2018, now Pat. No. 10,169,938, which is a
(Continued)

(51) Int. Cl.
*G07C 9/28* (2020.01)
*G06K 19/07* (2006.01)
(Continued)

(52) U.S. Cl.
CPC ............... *G07C 9/28* (2020.01); *G06K 7/00* (2013.01); *G06K 19/0723* (2013.01); *G07C 9/00309* (2013.01)

(58) Field of Classification Search
CPC .. G07C 9/00111; G07C 9/00309; G07C 9/28; G06K 7/00; G06K 19/0723
(Continued)

(56) References Cited

U.S. PATENT DOCUMENTS 3,781,773 A 12/1973 Ravas
6,535,136 B1 3/2003 Rodenbeck et al.
(Continued)

OTHER PUBLICATIONS

International Search Report; International Searching Authority; International Patent Application No. PCT/US2016/068360; dated May 22, 2017; 4 pages.
(Continued)

*Primary Examiner* — Allen T Cao
(74) *Attorney, Agent, or Firm* — Taft Stettinius & Hollister LLP

(57) ABSTRACT

An access control device including a credential reader circuit configured to enter a standby mode, awaken from a standby mode, and receive data from a nearby credential. The access control device further includes a credential detection circuit having a memory configured to store program instructions, an antenna, and a processor electrically coupled to the antenna and to the credential reader circuit, wherein the processor is configured to execute the stored program instructions to: transmit an interrogation signal, receive a reflected interrogation signal with the antenna, transmit an activation signal to the credential reader circuit in response to the received reflected interrogation signal wherein the reflected interrogation signal includes I and Q values, receive a false detection signal from the credential reader circuit, and adjust at least one of the I and Q threshold values of the reflected interrogation signal.

20 Claims, 7 Drawing Sheets

Related U.S. Application Data continuation of application No. 15/275,941, filed on Sep. 26, 2016, now Pat. No. 9,978,194.

(60) Provisional application No. 62/271,079, filed on Dec. 22, 2015.

(51) Int. Cl.
 *G07C 9/00* (2020.01)
 *G06K 7/00* (2006.01)

(58) Field of Classification Search
 USPC .................................................. 340/5.6–5.65
 See application file for complete search history.

(56) References Cited

U.S. PATENT DOCUMENTS

| | | |
|---|---|---|
| 6,744,825 B1 | 6/2004 | Rimstad et al. |
| 6,905,074 B2 | 6/2005 | Charrat |
| 7,245,222 B2 | 7/2007 | Bierach |
| 8,203,429 B2 | 6/2012 | Borcherding |
| 8,319,612 B2 | 11/2012 | Borcherding |
| 8,587,405 B2 | 11/2013 | Denison et al. |
| 9,609,462 B2 | 3/2017 | Warren et al. |
| 2006/0181393 A1 | 8/2006 | Raphaeli |
| 2007/0039041 A1 | 2/2007 | Davis |
| 2007/0247316 A1 | 10/2007 | Wildman et al. |
| 2011/0156866 A1 | 6/2011 | Denison et al. |
| 2011/0248834 A1 | 10/2011 | Warner et al. |
| 2013/0181869 A1 | 7/2013 | Chawla et al. |
| 2015/0276266 A1 | 10/2015 | Warren et al. |
| 2017/0228953 A1* | 8/2017 | Lupovici ............ G07C 9/00309 |
| 2018/0062240 A1* | 3/2018 | Nardelli ................ H04W 76/27 |

OTHER PUBLICATIONS

International Written Opinion; International Searching Authority; International Patent Application No. PCT/US2016/068360; dated May 22, 2017; 5 pages.

* cited by examiner

US 10,713,875 B2

LOW POWER CREDENTIAL DETECTION DEVICE FOR ACCESS CONTROL SYSTEM

CROSS REFERENCE TO RELATED APPLICATIONS

This application is a continuation of U.S. patent application Ser. No. 15/986,370 filed May 22, 2018 and issued as U.S. Pat. No. 10,169,938, which is a continuation of U.S. patent application Ser. No. 15/275,941 filed Sep. 26, 2016 and issued as U.S. Pat. No. 9,978,194, which claims the benefit of U.S. Provisional Application Ser. No. 62/271,079 filed Dec. 22, 2015, the contents of each application hereby incorporated by reference in their entirety.

TECHNICAL FIELD

The present application generally relates to a low power credential reader system, and more particularly but not exclusively relates to a low power credential reader system including a credential detector for an access control system which reduces power consumption.

BACKGROUND

Present credential readers suffer from a variety of limitations including high power consumption, reduced credential detection range, and a high false credential detection rate. For example, certain credential detectors of credential readers are not calibrated after a series of false credential detects which can be caused by environmental factors such as a change in temperature. In another example, certain credential detectors are calibrated by unnecessarily increasing the range of allowable impedance values, thereby desensitizing the detector, causing the effective range of the credential detector to be significantly reduced. Therefore, a need exists for further technological developments in the area of credential detectors.

SUMMARY

Exemplary embodiments include unique credential readers systems, detector systems, methods, techniques and apparatuses for access control systems. Further embodiments, forms, objects, features, advantages, aspects and benefits of the disclosure shall become apparent from the following description and drawings.

In one embodiment, there is provided an access control device including a credential reader circuit structured to enter a standby mode, awaken from a standby mode, and receive data from a nearby credential, and a credential detection circuit. The credential detection circuit includes a memory configured to store program instructions, an antenna, and a processor electrically coupled to the antenna and to the credential reader circuit. The processor is configured to execute the stored program instructions to: transmit an interrogation signal; receive a reflected interrogation signal with the antenna; transmit an activation signal to the credential reader circuit in response to the received reflected interrogation signal, wherein the reflected interrogation signal has I and Q values; receive a false detection signal from the credential reader circuit; and adjust at least one of the I and Q values of the reflected interrogation signal.

In another embodiment, there is provided a method of calibrating a wakeup device. The method includes setting an I threshold value and a Q threshold value; energizing an antenna to transmit an interrogation signal; receiving a reflected interrogation signal; transmitting an activation signal to a credential reader circuit in response to the reflected interrogation signal, wherein the reflected interrogation signal includes I and Q signal values; receiving a false detection signal; and adjusting at least one of the I threshold value and the Q threshold values as a function of the I signal value and the Q signal value.

DETAILED DESCRIPTION OF ILLUSTRATIVE EMBODIMENTS

Figure 1:
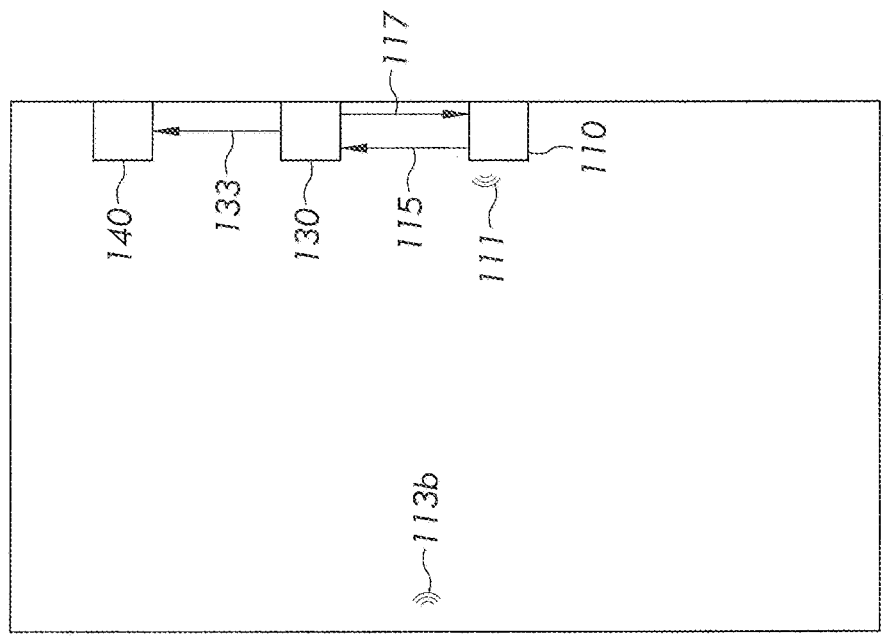
FIG. 1 is an exemplary access control system.
Figure 1:
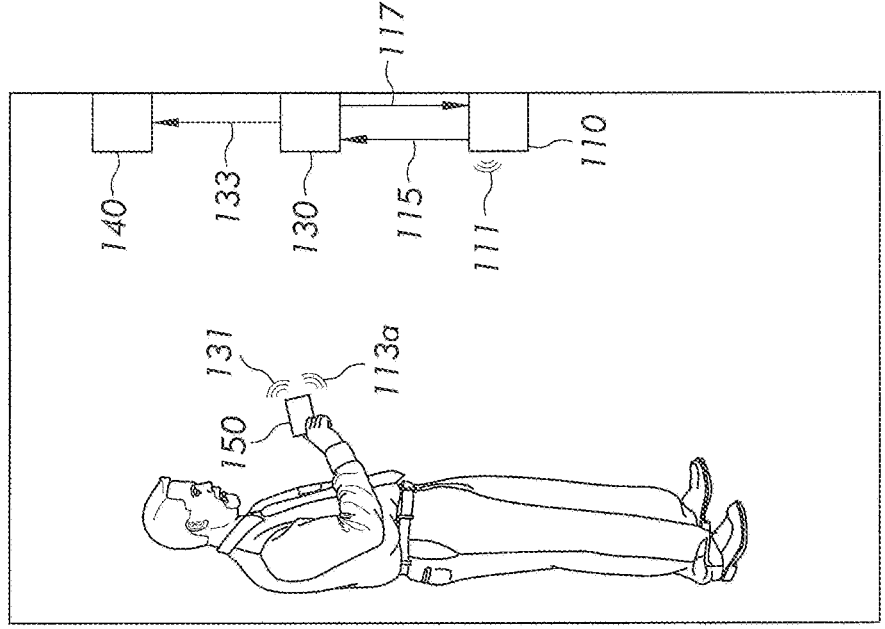

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, illustrated therein is an exemplary access control system 100 including a credential detector 110, a credential reader 130, and an access device 140. As illustrated, the system 100 is structured to grant or deny access to an interior room of a building. In certain embodiments, the system 100 may be structured to grant or deny access to a building or another secured area.

The credential detector 110 is structured to transmit an interrogation signal 111 and receive a reflected interrogation signal 113a, 113b. The interrogation signal 111 includes a ping or series of pings. The length of each ping, in some embodiments, varies to decrease signal noise. The interrogation signal 111, in some embodiments, is inverted to reduce signal noise.

As illustrated in FIG. 1, the reflected interrogation signal 113a may be affected by the presence of a credential 150 or, as illustrated in FIG. 1, the reflected interrogation signal 113b need not be affected by the presence of an RF credential 150. Credentials include, but are not limited to, low frequency proximity credentials and smart card credentials. Regardless of the presence of the RF credential 150, the reflected interrogation signal may be affected by other factors such as, for example, changes in temperature.

The electrical characteristics of the reflected interrogation signal 113a, 113b are received by the credential detector 110 and compared to threshold values determined by an initial calibration of the credential detector 110. The credential detector 110 is structured to transmit a reader activation signal 115 to the credential reader in response to a determination that the electrical characteristics of the reflected interrogation signal 113, 113b exceed the threshold values.

The credential reader 130 is structured to activate and receive credential data 131 from the RF credential 150 in response to receiving the activation signal 115. With respect to FIG. 1, the credential reader either grants or denies access to the secured area in response to receiving the credential data 131 by transmitting an access device activation signal 133 to the access device 140. With respect to FIG. 1, in one embodiment, the credential reader 130 is configured to transmit a false detect signal 117 to the credential detector 100 in response to activating the credential reader 130 and the reader 130 not detecting a credential 150. In another embodiment, the credential reader is not configured to transmit a false detection signal.

Figure 2:
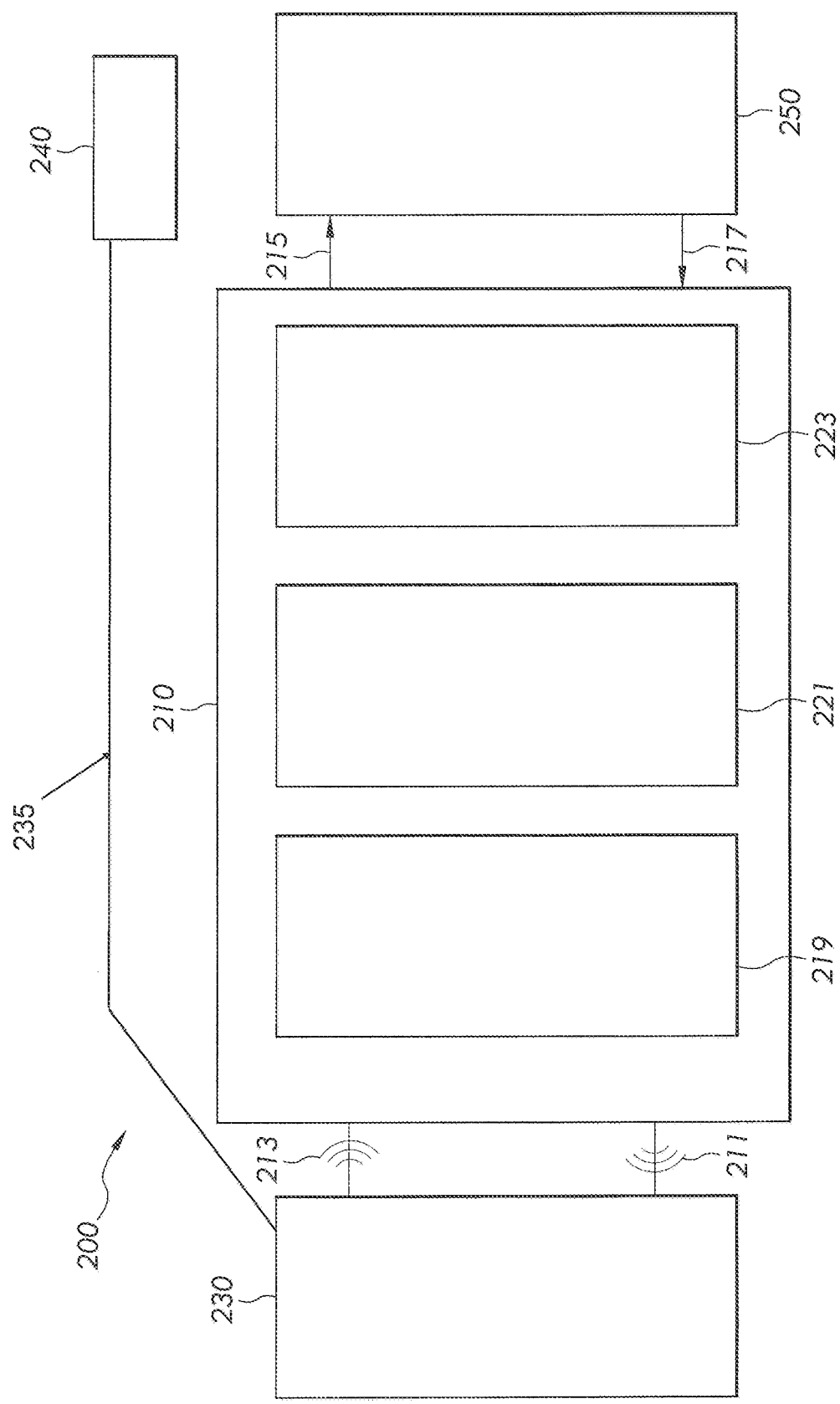
FIG. 2 is another exemplary access control system.

Referring to FIG. 2, there is illustrated another exemplary access control system 200. The system 200 includes a credential detector 210, a credential reader 230, and an access device 240. Credential detector 210 includes an antenna 219, a processing device 221 or processor, and a memory device 223. The antenna 219 is structured to generate an interrogation signal 211 and to receive a reflected interrogation signal 213. The memory device 223 is structured to store and retrieve data including electrical characteristics of interrogation signals. The processing device 221 is structured to receive the reflected interrogation signal 213 from the antenna 219.

The credential reader 230 is in electrical communication with the credential detector 210. The credential reader 230 is structured to look for a credential 250 in response to receiving an activation signal 215 from the credential detector 210. In one embodiment, the credential reader 230 is additionally structured to transmit a false detect signal 217 to the credential detector 210 in response to failing to detect a credential 250 after receiving an activation signal 215. In response to receiving the credential data from the credential 250, the credential reader 230 is structured to generate an external device activation signal 235 in response to positively verifying the credential 250.

Figure 3:
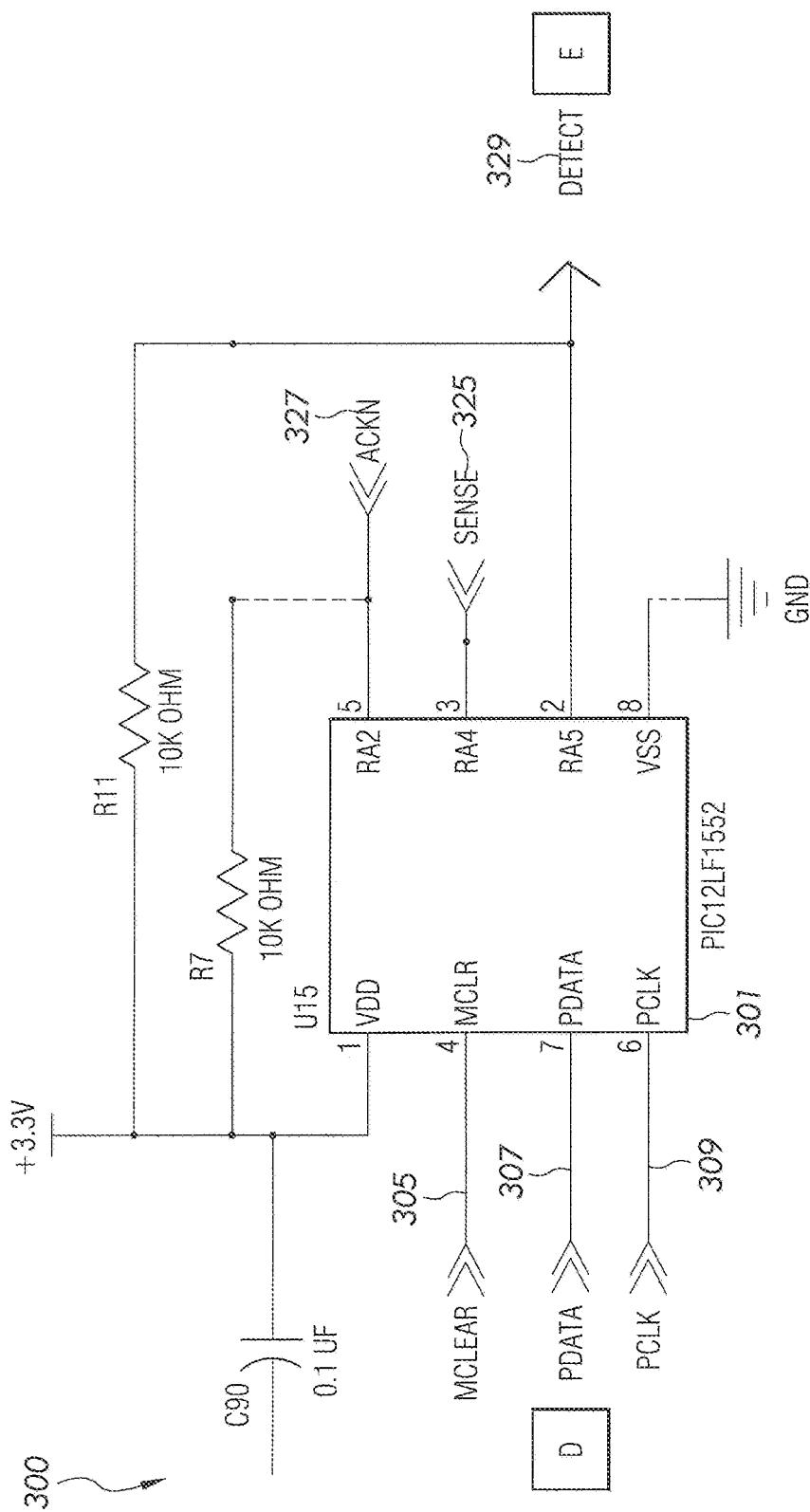
FIG. 3 is a circuit diagram for a wakeup device.

Referring to FIG. 3, illustrated therein is an exemplary credential detector circuit 300. In the illustrated embodiment, the circuit 300 includes a Microchip PIC12LF1552 microcontroller 301, available from Microchip Technology Inc. of Chandler, Ariz. ("Microchip"). The circuit 300 operates in a standalone mode and only requires power. The device captures and analyzes the reflected signals 307 ("D"), and makes a decision without any external influence. When a detection condition exists, a digital signal 329 ("E") is asserted to alert any concerned devices.

The circuit 300 produces little or no false detections and consumes very little power. In this embodiment, a false detect signal is not provided. Battery life is extended and detection performance is as good as or better than previously known circuits. Specifically, microcontroller 301 is used along with the standard sensor library (firmware) provided by Microchip. The PICLF1552 device is configured for low power consumption. The device sleeps, wakes up and produces a series of electronic pulses that propagate to an open ended copper antenna etched on a circuit board. The reflections from the pulses on the antenna are captured and analyzed by firmware. An environmental assessment is taken to establish a baseline value. Subsequent measurements are taken and the results are compared to the baseline. When a significant change is detected, the device asserts a pulse to inform the reader microcontroller to wake up and look for a credential. This is a fully contained and standalone solution that encompasses all related firmware and hardware in a single package.

A clear signal 305 is provided as an input at pin 4, data input 307 is provided at pin 7, and a clocking signal 309 is provided at pin 6 of the microcontroller 301. An acknowledgement signal 327 is provided to pin 5, and a sense signal 325 is provided at pin 3 of the microcontroller 301.

Figure 4:
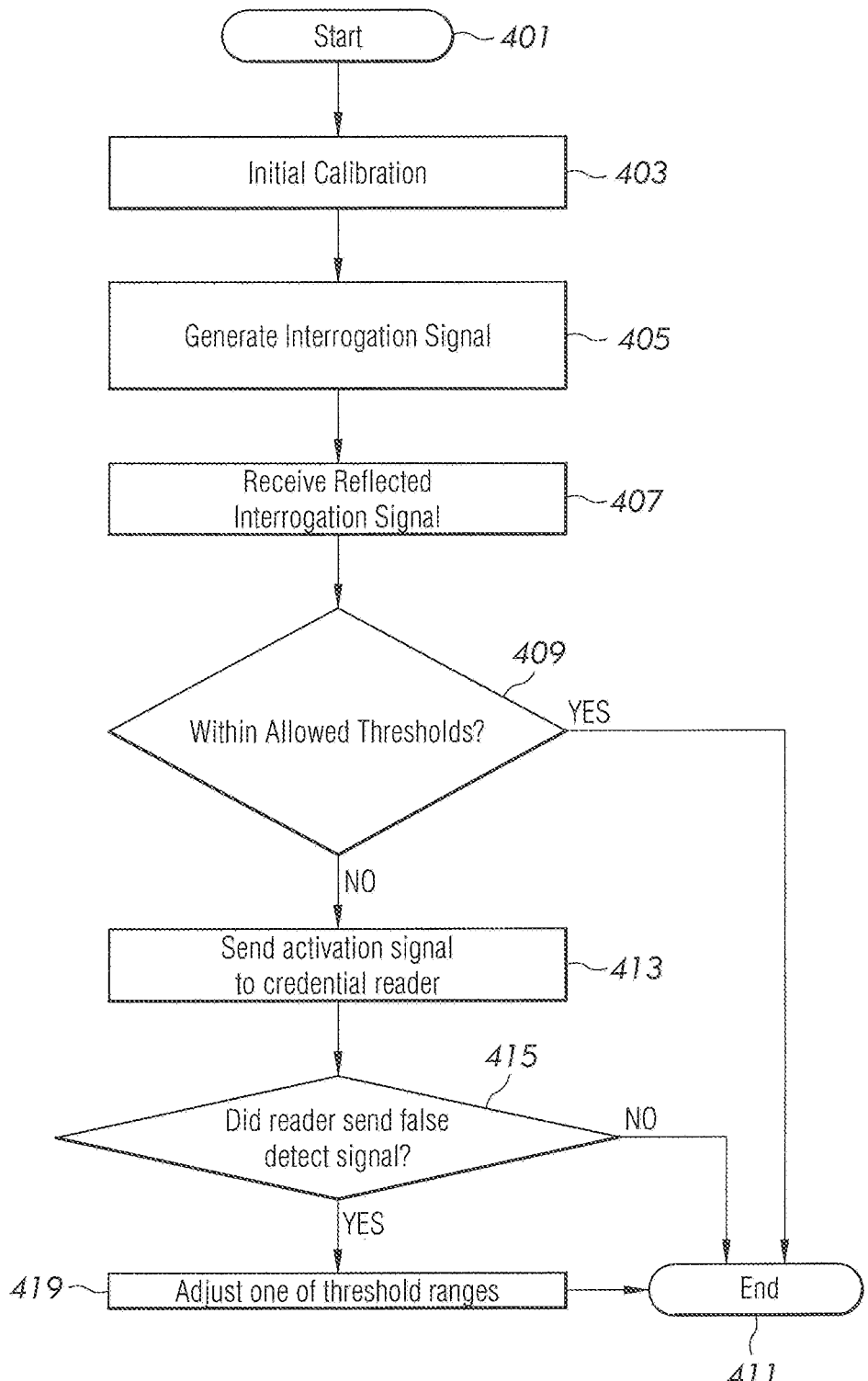
FIG. 4 is a flowchart illustrating an exemplary method for calibrating an access control system.

Referring to FIG. 4, illustrated therein is an exemplary process 400 which may be performed using the access control system 100. Operations illustrated for the processes in the present application are understood to be exemplary only, and operations may be combined or divided, and added or removed, as well as re-ordered in whole or in part. It is also contemplated that certain operations or steps performed in the process 400 may be performed wholly by the credential detector 110, the credential reader 130, or that the operations or steps may be distributed among one or more of the elements and/or additional devices or systems which are not specifically illustrated in FIGS. 1-3.

Process 400 begins at start operation 401 where the system 100 provides a false detect signal. Process 400 then proceeds to operation 403 where threshold values of a credential detector are initially calibrated. Process 400 then proceeds to operation 405 where the credential detector generates an interrogation signal. Process 400 then proceeds to operation 407 where the credential detector receives the reflected interrogation signal. Process 400 then proceeds to conditional 409 where electrical characteristics of the reflected interrogation signal are compared to the threshold values. Process 400 then proceeds to end operation 411 in response to determining that the electrical characteristics of the reflected interrogation signal are within the threshold values. In response to determining whether the electrical characteristics of the reflected interrogation signal are not within the threshold values, the process 400 then proceeds to operation 413 where the credential detector transmits an activation signal to a credential reader. Process 400 then proceeds to conditional 415 where the credential detector waits to receive a false detection signal. If the credential detector does not receive a false detect signal, process 400 then proceeds to end operation 411. If the credential detector does receive a false detect signal from the credential reader, the credential reader recalibrates the threshold values of one of the electrical characteristics of the reflected interrogation signal at operation 419. Once adjusted, process 400 then proceeds to end operation 411.

In one embodiment, process 400 is executed, in part, by a CLRC663 integrated circuit chip available from NXP Semiconductor, which provides basic example code to control the CLRC663 integrated chip's low power credential detection calibration and sensitivity. Low power credential detection (LPCD) for the NXP Semiconductor CLRC663 chip works by repeatedly energizing the antenna for a selectable amount of time in the microsecond (µs) range. While the antenna is energized, the CLRC663 firmware performs an operation that returns two values, the in-phase and the quadrature-phase signals (I and Q), which are affected by the proximity of credential or other material to the antenna. These digital values range from hex 00-3F, and are a representation of the antenna impedance. Each energizing pulse or "ping" generates a reading for the I and Q values. When a ping returns values outside a selectable range from those read on a previous ping, an interrupt signal is sent out from the CLRC663 chip which, in some embodiments, is used to initiate subsequent processes on external devices. The antenna is energized at CLRC663 voltage of 1 volt for each ping, and when a ping is detected such that an interrupt signal is sent from the CLRC663, the antenna is energized to read a credential at a selectable voltage of CLRC663 voltage—(0 v to 1V). In one embodiment, CLRC663 chip generates a voltage about 1V for a credential read so that the antenna can use the maximum power on each ping without exceeding any component power limits on a credential read. In one embodiment, the code used by the CLR663 chip provides basic control of the I and Q settings by supplying a single variable that can be adjusted to set the range for I and Q at the values read during initial calibration ±x. This calibration occurs once using a predetermined value of x, and is not updated thereafter.

The I and Q values stored on the CLRC663 chip are analog to digital conversions (ADC) which can cause low power credential detection jitter when one of the analog values falls between bits of the ADC after conversion. For example, if the analog value for Q would be read at 08.5, the ADC would interpret the value as either 08 or 09 when making a digital conversion. On a subsequent LPCD ping, the digital conversion could be rounded in the opposite direction causing an interrupt signal to be sent out from the CLRC663 chip even though no object was detuning the antenna in an event known as a false-detection. False-detections pose a problem for battery-operated products because they can significantly reduce battery life when a product repeatedly and unnecessarily expends energy attempting to perform LPCD interrupt-based tasks.

The example code provided by NXP Semiconductor provides basic control of the I and Q settings by supplying a single variable that can be adjusted to set a range for I and Q at the values read during initial calibration ±x, with the larger the x value becomes, the less sensitive the antenna becomes, with zero being the most sensitive. Increasing the value of x can quickly cause excessive detuning due to each increment of x adding two values to the accepted I and Q ranges, with one at the high-end of the range, one at the low end of the range, and with both I and Q ranges linked to the same variable. An antenna detuned in this way would have fewer false-detects, but would decrease the range at which a valid detection could occur.

A product using an approach based on the NXP Semiconductor example code also fails to account for fluctuations in temperature (which can change the I and Q values returned with each ping when large enough), and for variation between parts such as discrete electrical components, printed circuit boards, enclosures, spacing during assembly, etc. (which can all change the I and Q values returned with each ping).

In one embodiment, a process deviates from the static NXP Semiconductor example code by calibrating, in a dynamic way, the I and Q values returned with each ping to adapt to current device and environmental conditions. In this embodiment, better power efficiency and sensitivity are maintained over long periods of time.

In one embodiment, the process recalibrates signal values in response to false-detect events. Second, the process divides the calibration of the I and Q values into separate steps. Third, the process sets the range for I and Q calibration, not based on the initial calibration value ±x, but instead sets the minimum and maximum range values based on the noise seen on each individual unit. In another embodiment, the process detunes only one of the I or the Q values at one time to further improve the antenna sensitivity in more extreme environments. All these changes result in lower average power consumption and a more sensitive antenna, meaning a longer battery life and better user interface for the user.

In contrast to the single initial calibration approach used by the NXP Semiconductor example code, in some embodiment, the described processes perform a calibration each time a false-detect event occurs, with logic to detune the antenna in the case of excessive false-detect events (five or more in one embodiment). This allows for the maximum initial antenna sensitivity for maximum LPCD range, while still allowing for energy saving in case of noise on the I and Q values that would cause repeated false-detections. In the event of an action that causes the I and Q values to change slightly (such as temperature variations), a small amount of false-detect events (four or less in one embodiment) are allowed so that the antenna can remain as sensitive as possible.

In one embodiment, the I and Q ranges are separated and determined independently. The example code provided by the NXP chip uses the initial calibration values for I and Q±x, and sets the minimum and maximum range values for both I and Q based on the single value x. This is not ideal for maximum antenna sensitivity if only the I or the Q value needs to be detuned due to noise. By separately determining the ranges for I and Q, even when one value must be detuned, the overall antenna sensitivity may remain high by not detuning the other value. For example, if the NXP Semiconductor example code calibration returned I=10, Q=2F with the selection ±x=1, the minimum ranges would be set to I=09, Q=2E and the maximum ranges would be set to I=11, Q=30. In contrast, the illustrated embodiment of process 400 removes the ±x value and controls the four values for the range of I and Q separately (min/max I and min/max Q).

In another embodiment, the range of each of the I and Q values is determined based on the minimum and maximum noise seen on each. This is accomplished by tracking which value, I or Q, is responsible for a false-detection, and opening up the allowed range on one or both of I and/or Q after a number of false-detections (five in one embodiment). When a false-detection on the I and/or Q value exceeds the allowed false-detect count by moving past the upper limit of the acceptable range, the process recalibrates to set the maximum range value to this new higher value while setting the minimum range to one less than this value. The reverse is true when a false-detection exceeds the allowed false-detect count by moving past the lower limit of the acceptable range. For example, if a particular calibration were to set I=10 and Q=2F, and then Q repeatedly false-detected between Q=30 and Q=2F for the allowed false-detect count of Q, the next false detect at Q=30 would set the maximum range to Q=30 and the minimum range to Q=(30−1)=2F. The noise initially causing the Q value to false-detect is then covered by the allowable range of Q, and no longer causes false-detections. In order to maintain the highest stable sensitivity on the antenna, the process recalibrates on a successful credential read by setting the minimum and maximum ranges for I and Q to the same values, and also resets I and Q false-detect counts to zero. This allows noise caused by temporary environmental fluctuations, such as temperature, to be accounted for without permanently sacrificing antenna performance, and also accounting for the potential of persistent noise on a particular unit.

In another embodiment, the process 400 detunes the I and Q values mutually exclusively for a set number of false-detections. Fluctuations in temperature can cause the I and Q values to transition between hex values (one hex value higher or lower than previously calibrated), but the I and Q values do not transition at the same temperatures. The process takes this into account by resetting the accepted range of one value when the other value false-detects excessively for a limited number of resets (three in one exemplary embodiment). For example, if the Q value false-detected five times in a row, it would be detuned to prevent further false-detections. If the I value then false-detected five times in a row and was detuned, the Q value detuning would be reset to the minimum range. This reset is counted as one reset, with the allowance for the process to repeat two additional times before both I and Q were allowed to be detuned at the same time. This process prevents a rare detuning case that can arise from either I or Q becoming detuned due to ADC rounding and causing rapid transitions at certain temperatures (specific temperatures vary depending on unit), and then the process repeating for the opposite value (Q for I, and I for Q).

Figure 5:
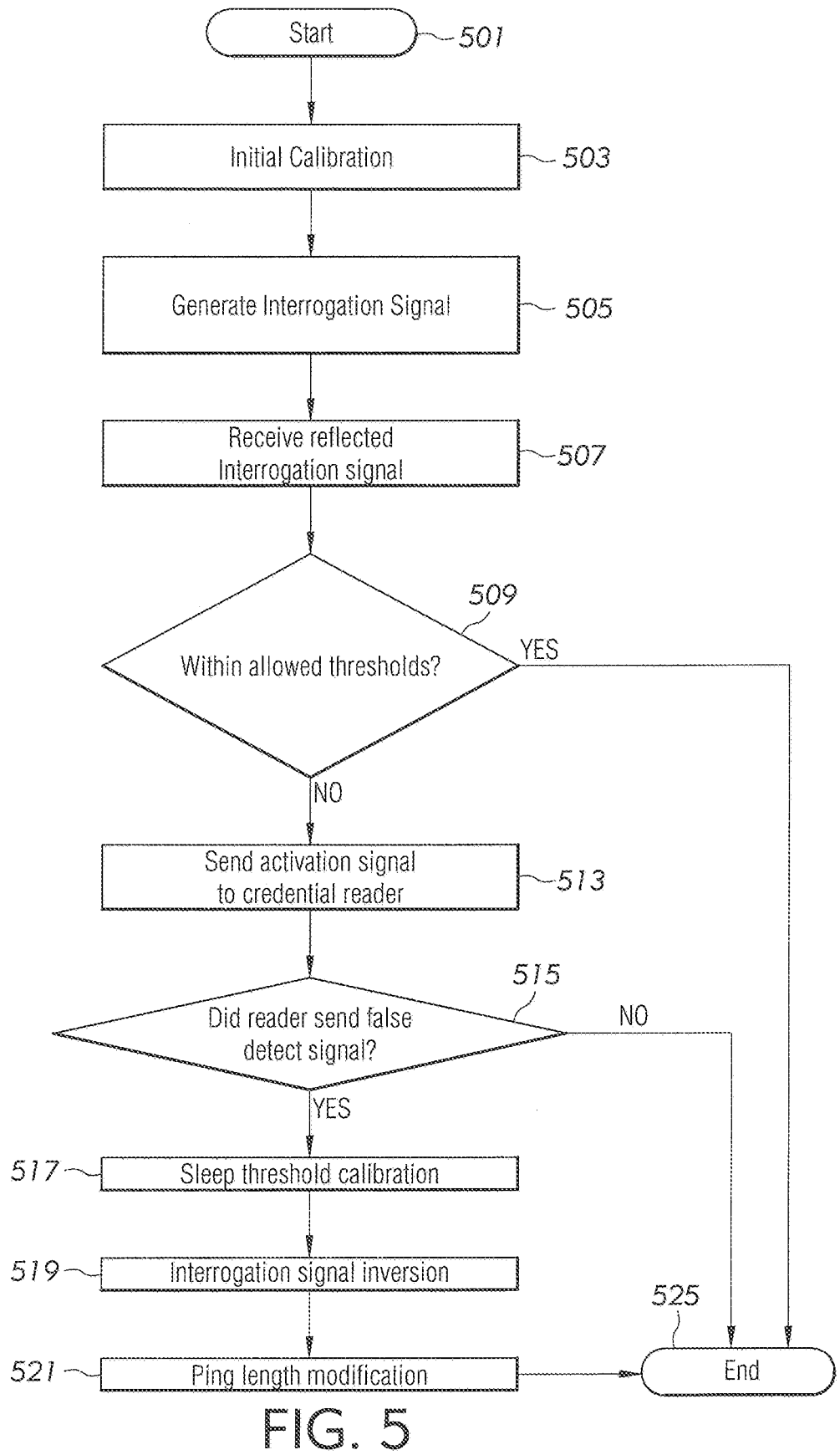
FIG. 5 is a flowchart illustrating another exemplary method for calibrating an access control system.

Referring to FIG. 5, in some embodiments, an exemplary process 500 is performed using the access control system 100 illustrated and described herein. Operations illustrated and described for the processes disclosed herein are understood to be exemplary only, and operations may be combined or divided, and added or removed, as well as re-ordered in whole or in part, unless explicitly stated to the contrary. Unless specified to the contrary, it is contemplated that certain operations or steps performed in the process 500 may be performed wholly by the credential detector 110, the credential reader 103, or that the operations or steps may be distributed among one or more of the elements and/or additional devices or systems which are not specifically illustrated in FIGS. 1-3.

Process 500 begins at start operation 501. Process 500 then proceeds to operation 503 where threshold values of a credential detector are initially calibrated. Process 500 then proceeds to operation 505 where the credential detector generates an interrogation signal. Process 500 then proceeds to operation 507 where the credential detector receives the reflected interrogation signal. Process 500 then proceeds to conditional 509 where electrical characteristics of the reflected interrogation signal are compared to the threshold values. Process 500 then proceeds to end operation 525 in response to determining that the electrical characteristics of the reflected interrogation signal are within the threshold values. In response to determining the electrical characteristics of the reflected interrogation signal are not within the threshold values, the process 500 proceeds to operation 513 where the credential detector transmits an activation signal to a credential reader. Process 500 then proceeds to conditional 515 where the credential detector waits to receive a false detection signal. If the credential detector does not receive a false detect signal, process 500 then proceeds to end operation 525. Process 500 then proceeds to operation 517 where the dynamic sleep thresholds are recalibrated. Process 500 then proceeds to operation 519 where the interrogation signals sent by the credential detector are selectively inverted. Process 500 then proceeds to operation 521 where the ping width is modified. Process 500 then proceeds to end operation 525.

In one embodiment, process 500 is executed by a CLR663 integrated chip. Process 500 mitigates the CLR663 chip's inherent problem of false detections. Using firmware mechanisms, such as alternating transmit modes, switching between multiple ping widths, and dynamic sleep thresholds, process 500 can conserve battery life as well as increased read range. The CLRC663 chip uses a mode called Low Power Credential Detection in which it pings for changes in the RF field, and if the field changes such that the new field exceeds the set sleep thresholds, the CLRC663 chip will wake up. While in LPCD mode, the analog to digital converter (ADC) that measures the RF field's state is susceptible to digital noise that occurs because the bits in the ADC do not change synchronously in LPCD mode. Thus, if the ADC's value changes from 001001 to 001010, it will actually clear bit 0 first, then set bit 1 afterwards. This second step will cause a jump from 001000 to 001010. If this noise occurs at the end of the ping when the ADC stops sampling, it is possible for the CLRC663 to report incorrect values. This noise can occur at different areas along the ping. Thus, it is not problematic if the noise is not at the end of the ping. However, an issue or problem may arise if the location of the noise can shift around on the ping due to temperature changes. Thus, it is possible for the CLRC663 chip to wake up from the noise indefinitely, thereby draining the batteries.

Increasing the CLRC663's sleep thresholds reduces the detect range of objects in the field. NXP's sample code has these values set to +/−1 of the calibrated field values. While increasing the value of the sleep thresholds can keep the CLRC663 chip from false detections, the credentials being detected must be placed closer to the detector in order for the credential to be detected. On the other hand, if the thresholds are set to +/−0, the detect range increases, but more false detects occur due to small fluctuations in the RF field.

In one embodiment, the dynamic sleep threshold feature is used to keep the CLRC663 chip asleep during small fluctuations of the RF field that may be caused by the analog signal resting between two digital steps while providing an improved credential detect range. To provide this feature, the last RF field values are stored in memory. If the new values increase, then the new sleep threshold's maximum value is set to the current field value, and the minimum value is set to the current field value minus one, and vice versa, if the field values are decreased from the previous values. In this way, if the value keeps toggling between two digital values, the RC663 chip will not wake up for those events. This feature also creates an interval length of 2, instead of 3, thereby increasing the potential for better detect range.

The alternating transmission inversion feature is used to adjust the operation of the CLRC663 chip to a state where there is no noise at the end of the LPCD ping. There are two transmit lines—TX2 and TX1. By changing which transmit line is inverted, the reported characteristics change such that the noise is reduced or is no longer present. It is possible, however, that both TX2 and TX1 inverted states do have noise at the end of the ping when the ADC stops sampling.

To mitigate this scenario further, the width of the dynamic ping is adjusted. Once ADC noise is detected on one of the lines, the TX line is inverted. The inversion of the TX line continues every time noise is detected. Once the number of times a noisy result exceeds a certain threshold, the ping width is changed to reduce or eliminate noise at the end of the new ping width. If the ping width is changed so that the ADC stops sampling in a new location where there is no noise, the result will be improved measurements. Alternating between multiple ping widths is conducted while noise is being experienced. The ping width resets to the smallest value on a legitimate credential detect (or when a certain amount of time has passed without any noisy measurements). It is also important that attempts to invert the TX lines and detect credential presence do not adversely affect the credential read time. The process implements one or more optimizations specifically to maintain short credential read times while mitigating battery drainage issues.

Figure 6:
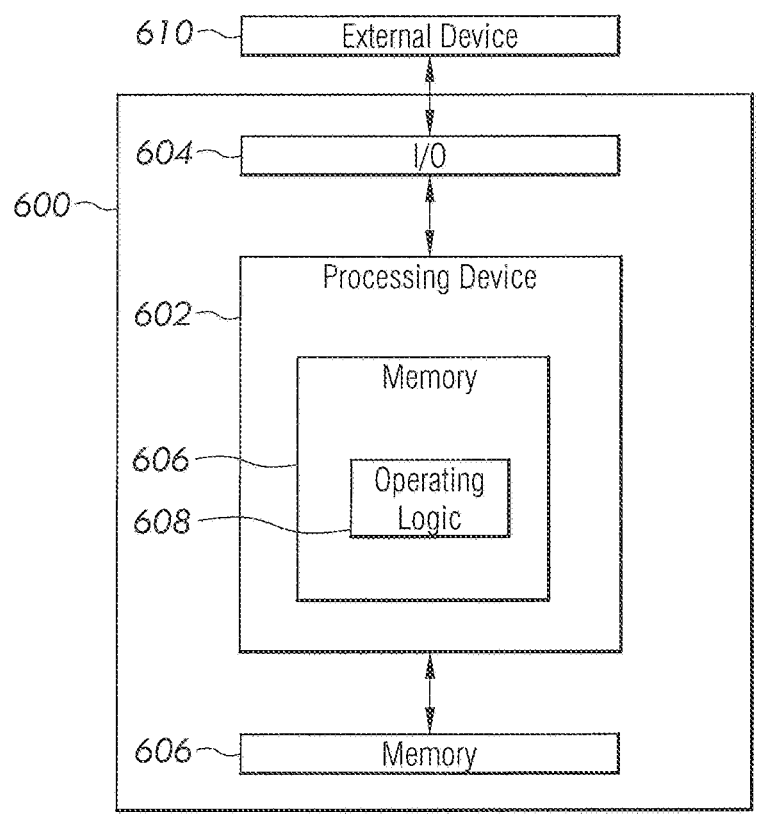
FIG. 6 is an exemplary processor for a wakeup device.

Referring to FIG. 6, there is illustrated a schematic block diagram of a computing device 600. The computing device 600 is one example of a computer, server, mobile device, reader device, or equipment configuration which is utilized, in different embodiments, in connection with the credential detector 110, credential reader 130, credential 150, or external device 140 shown in FIG. 1. The computing device 600 includes a processing device 602, an input/output device 604, memory 606, and operating logic 608. Furthermore, the computing device 600 communicates with one or more external devices 610.

The input/output device 604 enables the computing device 600 to communicate with the external device 610. For example, the input/output device 604 in different embodiments is a network adapter, network credential, interface, or a port (e.g., a USB port, serial port, parallel port, an analog port, a digital port, VGA, DVI, HDMI, FireWire, CAT 5, or any other type of port or interface). The input/output device 604 is comprised of hardware, software, and/or firmware. It is contemplated that the input/output device 604 includes more than one of these adapters, credentials, or ports.

The external device 610 in different embodiments can be any type of device that allows data to be inputted or outputted from the computing device 600. For example, the external device 610 in different embodiments is a mobile device, a reader device, equipment, a handheld computer, a diagnostic tool, a controller, a computer, a server, a printer, a display, an alarm, an illuminated indicator such as a status indicator, a keyboard, a mouse, or a touch screen display. Furthermore, it is contemplated that the external device 610 is be integrated into the computing device 600. It is further contemplated that more than one external device is in communication with the computing device 600.

The processing device 602 in different embodiments is a programmable type, a dedicated, hardwired state machine, or a combination of these; and can further include multiple processors, Arithmetic-Logic Units (ALUs), Central Processing Units (CPUs), Digital Signal Processors (DSPs) or the like. For forms of processing device 602 with multiple processing units, distributed, pipelined, and/or parallel processing can be utilized as appropriate. The processing device 602 may be dedicated to performance of just the operations described herein or may be utilized in one or more additional applications. In the depicted form, the processing device 602 is of a programmable variety that executes processes and processes data in accordance with operating logic 608 as defined by programming instructions (such as software or firmware) stored in memory 606. Alternatively or additionally, the operating logic 608 for processing device 602 is at least partially defined by hardwired logic or other hardware. The processing device 602 can be comprised of one or more components of any type suitable to process the signals received from input/output device 604 or elsewhere, and provide desired output signals. Such components may include digital circuitry, analog circuitry, or a combination of both.

The memory 606 in different embodiments is of one or more types, such as a solid-state variety, electromagnetic variety, optical variety, or a combination of these forms. Furthermore, the memory 606 can be volatile, nonvolatile, or a combination of these types, and some or all of memory 606 can be of a portable variety, such as a disk, tape, memory stick, cartridge, or the like. In addition, the memory 606 can store data that is manipulated by the operating logic 608 of the processing device 602, such as data representative of signals received from and/or sent to the input/output device 604 in addition to or in lieu of storing programming instructions defining the operating logic 608, just to name one example. As shown in FIG. 6, the memory 606 is be included with the processing device 602 and/or coupled to the processing device 602.

The processes in the present application may be implemented in the operating logic 608 as operations by software, hardware, artificial intelligence, fuzzy logic, or any combination thereof, or at least partially performed by a user or operator. In certain embodiments, units represent software elements as a computer program encoded on a non-transitory computer readable medium, the credential detector 110, the credential reader 130, the credential 150, or the external device 140 performs the described operations when executing the computer program.

Figure 7:
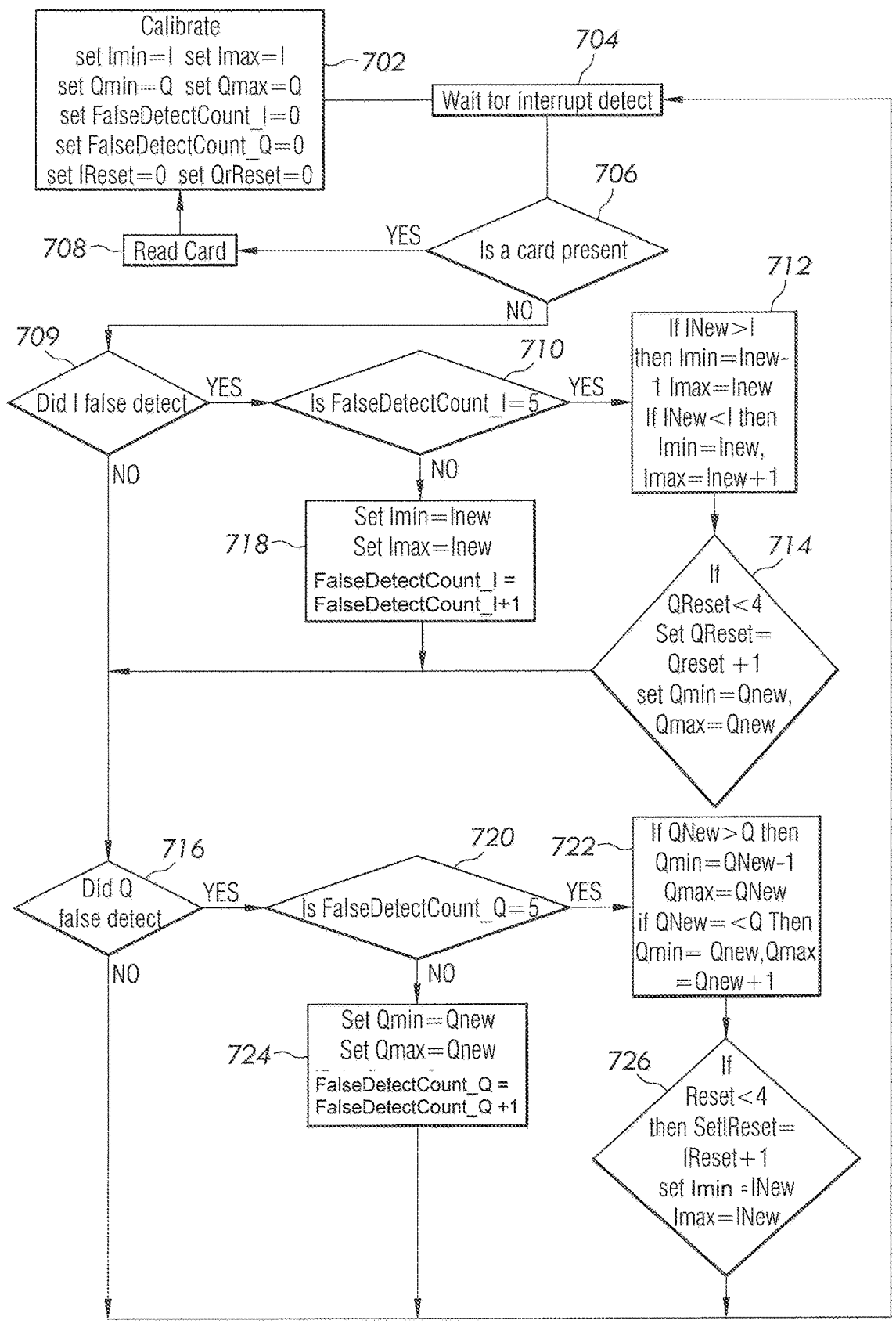
FIG. 7 is a flowchart of another exemplary method for calibrating an access control system.

FIG. 7 illustrates a block diagram of an exemplary process 700 to calibrate an access control system for reducing the number of false detects occurring, and to thereby reduce the power requirements of the access control system. As illustrated in FIG. 7, the process diagram is reduced to software and/or firmware configured to enable the CLRC663 integrated circuit chip to operate according the described inventive features of the present disclosure. The present disclosure is not, however, limited to the use of the CLR663 integrated circuit chip. The disclosed embodiments are equally applicable to other integrated circuits, customized circuit designs, and applications.

An initial calibration is made and is also performed every time a false-detect event occurs. When a false detect occurs, the thresholds are calibrated at blocks 712, 714, 718, 722, 724 and 726. An interrogation signal is transmitted and the returned signal is used to determine the initial calibration values. The returned signal is a signal determined by the credential detector being located at the point of installation and in the absence of a credential. The returned signal therefore represents the environment in which the reader is located. The initial values of both I and Q are determined for the returned signal. Once determined, the minimum value of I, Imin, is set to the determined value of I, and the maximum value of I, Imax, is also set to the determined value of I. The value of the minimum value of Q, Qmin, is set to Q and the maximum value of Q, Qmax is also set to the determined value of Q. A false detect count for I and a false detect count for Q are each set to zero. In addition, counters are set for both I and Q, such that a reset value for I, Ireset, is set to 0 and a reset value for Q, Qreset is set to 0.

Once the initial calibration has been determined at block 702, the access control device operates in a standby mode, where the device waits for in interrupt detect signal at block 704. Once an interrupt signal is detected, the access control device determines at block 706 whether a card (credential) is present. If a card is present, the card is read at block 708 and once read the process returns to the calibration block 702. Additionally, the Imin, the Imax, the Qmin, and the Qmax values are reset to the last "idle" field values, where no card was detected. However, if a card is not present, the process, at block 709, determines whether a false detect occurred. A false detect is determined during block 706. If the device wakes up from in interrupt at block 704, but a valid card could not be read at block 706, then a false detect has occurred. At this point, a determination is made as to whether the I value changed or the Q valued changed. If yes, the process determines separately the I range of acceptable values and the Q range of acceptable values. The credential includes, in different embodiments, an access card, a key fob, and a mobile device, such as a smartphone.

Once a false detect has occurred, the I range is determined first by determining at block 710 whether the false detect count for I is equal to 5. While the illustrated embodiment uses a false detect count of 5, other embodiments include different numbers of false detect counts. Also, the order of determining the I range of the Q range is not critical, and the Q range in other embodiments is determined first.

If the false detect count is equal to 5, then at block 712 it is determined that if INew is greater than 1, then Imin is set equal to INew minus 1, and Imax is set equal to INew. If however, INew is less than one, then Imin is set equal to INew and Imax is set equal to INew plus 1. Once the values of Imin and Imax have been set at block 712, at block 714 the values of QReset, Qmin, and Qmax are set. If QReset is less than 4, QReset is set to QReset plus 1, Qmin is set equal to Anew and Qmax is set equal to QNew. Once the values are set at block 714, a determination is made at block 716 of whether a Q false detect occurred.

As described above, fluctuations in temperature can cause the I and Q values to transition between hex values (one hex value higher or lower than previously calibrated), but the I and Q values do not transition at the same temperatures. The process 700 takes this into account by resetting the accepted range of one value when the other value false-detects excessively for a limited number of resets (three in one exemplary embodiment) as determined at block 714. This process prevents a rare detuning case that can arise from either I or Q becoming detuned due to ADC rounding causing rapid transitions at certain temperatures (specific temperatures vary depending on unit), and then the process repeating for the opposite value (Q for I, and I for Q).

Returning to block 710, if it was determined at block 710 that the false detect count for I was not equal to 5, then at block 718, Imin is set to INew, Imax is set to INew. Additionally, the FalseDetectCount I is set to the FalseDetectCount I plus 1. Once these values are set, then the determination of whether a Q false detect occurred at block 716 is made. If a Q false detect did not occur, the process returns to block 704 to wait for an interrupt detect.

Adjustments to the Qmin and Qmax values are made in a fashion similar to those made with respect to the determination of the Imin and the Imax values. Consequently, a conditional block 720, a determination block 722, and a determination block 724 for Q determine values of Qmin, Qmax, and a QFalseDetect Counter. Additionally, an IReset is completed at a block 726. If IReset is less than 4, then IReset is set to IReset plus one, Imin is set to INew, and Imax is set to INew. The process block 726 resets the accepted range of one value when the other value false-detects excessively for a limited number of resets (three in one exemplary embodiment).

At the completion of the functions of blocks 724 or 726 the process returns to block 704 where the wait for the interrupt detect occurs.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An access control device, comprising:
a credential reader circuit structured to enter a standby mode, awaken from a standby mode, and receive data from a nearby credential; and
a credential detection circuit, including:
a memory configured to store program instructions;
an antenna; and
a processor electrically coupled to the antenna and to the credential reader circuit, the processor configured to execute the stored program instructions to:
transmit an interrogation signal;
receive a reflected interrogation signal with the antenna; and
transmit an activation signal to the credential reader circuit in response to the received reflected interrogation signal.

2. The access control device of claim 1, wherein the credential detection circuit receives the reflected interrogation signal, analyzes the reflected interrogation signal, and transmits the activation signal to the credential reader circuit without external influence from another component of the access control device.

3. The access control device of claim 1, wherein the processor is further configured to execute stored program instructions to:
receive a false detection signal from the credential reader circuit; and
adjust, in response to the false detection signal, a threshold value associated with credential detection as a function of the reflected interrogation signal.

4. The access control device of claim 3, wherein the false detection signal is indicative of a failure of the credential reader circuit to detect a credential in response to receipt of the activation signal from the credential detection circuit.

5. The access control device of claim 3, wherein the reflected interrogation signal has a plurality of signal characteristics;
wherein the processor is further configured to executed stored program instructions to compare at least one signal characteristic of the plurality of signal characteristics to an associated threshold value in response to receipt of the reflected interrogation signal with the antenna; and
wherein the processor is configured to execute stored program instructions to transmit the activation signal to the credential reader circuit in response to a determination that the at least one signal characteristic surpasses the associated threshold value.

6. The access control device of claim 5, wherein the plurality of signal characteristics comprises at least one of an in-phase signal of the reflected interrogation signal or a quadrature phase signal of the reflected interrogation signal.

7. The access control device of claim 5, wherein the plurality of signal characteristics comprises at least one of a voltage amplitude, current amplitude, or impedance of the reflected interrogation signal.

8. The access control device of claim 3, wherein the threshold value is associated with at least one of an in-phase or quadrature signal value of the reflected interrogation signal.

9. The access control device of claim 1, wherein the processor is further configured to execute stored program instructions to:
receive a false detection signal from the credential reader circuit; and
adjust a dynamic sleep threshold of the credential detection circuit in response to the false detection signal.

10. The access control device of claim 1, wherein the processor is further configured to execute stored program instructions to:
  receive a false detection signal from the credential reader circuit; and
  invert at least one transmit line of the credential detection circuit in response to the false detection signal.

11. The access control device of claim 10, wherein the processor is further configured to execute stored program instructions to adjust a ping width of the credential detection circuit in response to inversion of the at least one transmit line of the credential detection circuit.

12. A credential detection circuit, comprising:
  an antenna;
  a processor electrically coupled to the antenna and to a credential reader circuit; and
  a memory comprising a plurality of instructions stored thereon that, in response to execution by the processor, causes the credential detection circuit to:
    transmit an interrogation signal;
    receive a reflected interrogation signal with the antenna; and
    transmit an activation signal to the credential reader circuit in response to the received reflected interrogation signal.

13. The credential detection circuit of claim 12, wherein the processor is configured to receive the reflected interrogation signal, analyze the reflected interrogation signal, and transmit the activation signal to the credential reader circuit without influence from a component external to the credential detection circuit.

14. The credential detection circuit of claim 12, wherein the processor is further configured to:
  receive a false detection signal from the credential reader circuit; and
  adjust, in response to the false detection signal, a threshold value associated with credential detection as a function of the reflected interrogation signal.

15. The credential detection circuit of claim 14, wherein the false detection signal is indicative of a failure of the credential reader circuit to detect a credential in response to receipt of the activation signal from the credential detection circuit.

16. The credential detection circuit of claim 14, wherein the reflected interrogation signal has a plurality of signal characteristics;
  wherein the processor is further configured to compare at least one signal characteristic of the plurality of signal characteristics to an associated threshold value in response to receipt of the reflected interrogation signal with the antenna; and
  wherein the processor is configured to transmit the activation signal to the credential reader circuit in response to a determination that the at least one signal characteristic surpasses the associated threshold value.

17. The credential detection circuit of claim 16, wherein the plurality of signal characteristics comprises at least one of an in-phase signal of the reflected interrogation signal or a quadrature phase signal of the reflected interrogation signal.

18. The credential detection circuit of claim 14, wherein the threshold value is associated with at least one of an in-phase or quadrature signal value of the reflected interrogation signal.

19. The credential detection circuit of claim 12, wherein the processor is further configured to:
  receive a false detection signal from the credential reader circuit; and
  adjust a dynamic sleep threshold of the credential detection circuit in response to the false detection signal.

20. The credential detection circuit of claim 12, wherein the processor is further configured to:
  receive a false detection signal from the credential reader circuit; and
  invert at least one transmit line of the credential detection circuit in response to the false detection signal.

* * * * *